United States Patent [19]

Egawa et al.

[11] Patent Number: 4,607,932
[45] Date of Patent: Aug. 26, 1986

[54] BATTERY CHECKING DEVICE

[75] Inventors: Akira Egawa; Takanori Kodaira, both of Tokyo; Akihiro Namai, Kanagawa, all of Japan

[73] Assignee: Canon Kabushiki Kaisha, Tokyo, Japan

[21] Appl. No.: 727,581

[22] Filed: Apr. 26, 1985

[30] Foreign Application Priority Data

Apr. 28, 1984 [JP] Japan .................................. 59-86891

[51] Int. Cl.$^4$ ....................... G03B 17/18; G08B 21/00
[52] U.S. Cl. ...................................... 354/468; 320/48; 340/636; 354/484
[58] Field of Search ..................... 354/468, 484, 173.1, 354/173.11, 212, 214; 324/429, 426; 320/48; 340/636

[56] References Cited

U.S. PATENT DOCUMENTS

| 4,190,344 | 2/1980 | Ishiguro et al. | 354/468 |
| 4,350,422 | 9/1982 | Maida | 354/468 |
| 4,376,265 | 3/1983 | Kiuchi et al. | 324/426 |
| 4,502,774 | 3/1985 | Suzuki et al. | 354/468 |

Primary Examiner—Russell E. Adams
Attorney, Agent, or Firm—Toren, McGeady, Stanger, Goldberg & Kiel

[57] ABSTRACT

Pulses of such frequency that an electromagnetic drive device does not operate in response thereto are produced by a pulse generating circuit. While these pulse are being applied to the electromagnetic drive device, the voltage of an electrical power source in the real load running state is detected by a battery checking circuit.

6 Claims, 3 Drawing Figures

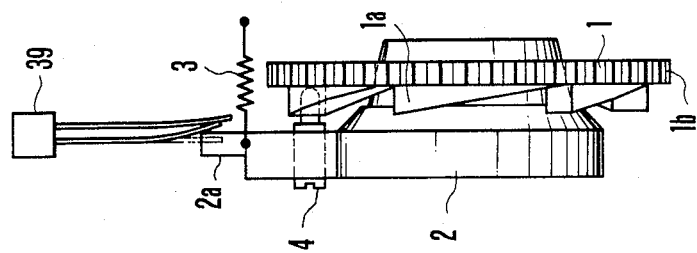
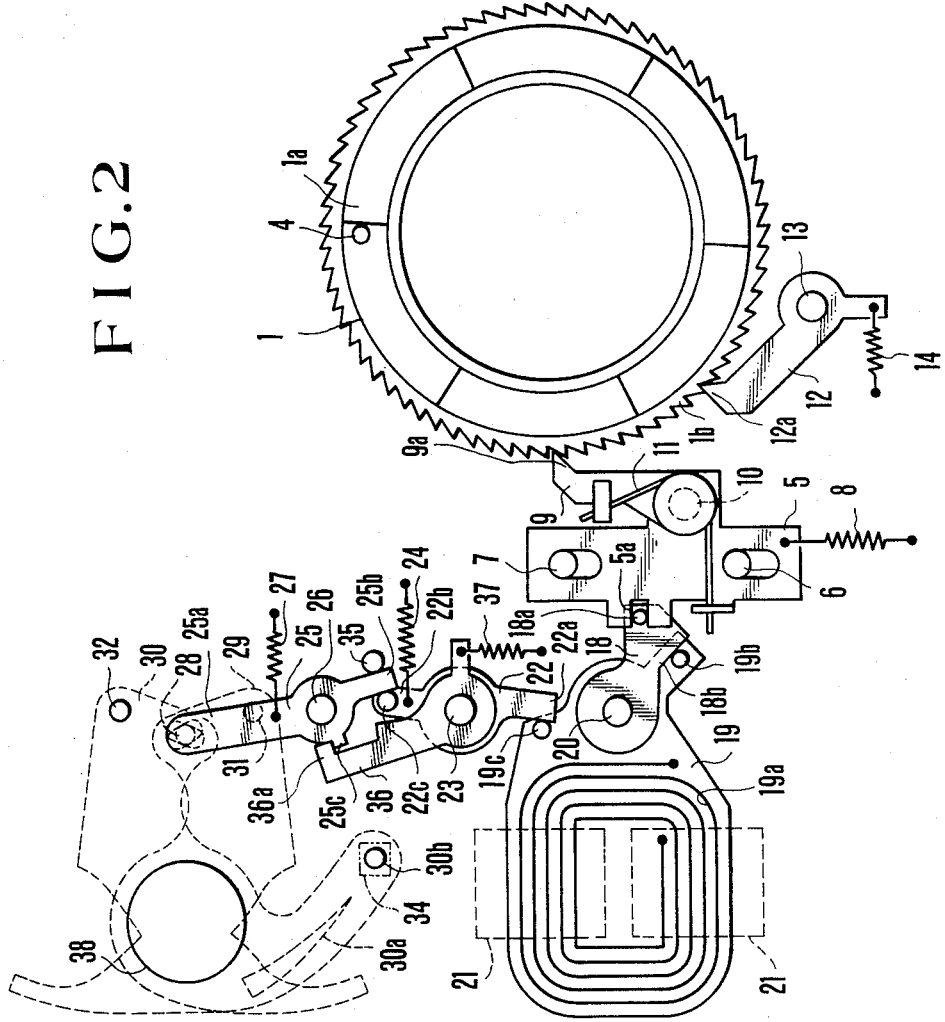

BATTERY CHECKING DEVICE

BACKGROUND OF THE INVENTION

1. Field of the Invention

This invention relates to a battery checking device for checking the voltage of an electrical power source of a camera in the real load running state.

2. Description of the Prior Art

Of the prior known battery checking methods employed in the cameras, when to carry out checking, a dummy resistor as a load is brought into connection with the battery to be checked, or a pulse of current of so short a duration as not to activate the electromagnetic drive device is allowed to flow to that device, or the light emitting element which has no influence on any operation of the camera is used as a load for the battery, or without using any bad, the battery is directly put to the checking.

However, the first method, because of its using the dummy load, is not suited for the small-sized cameras. With the second method, the battery voltage takes different values at the times coincident with the rising and falling edge of the pulse. It was, therefore, impossible to check the real load dependent voltage in a short time. The voltage value measured by the fourth method could not always be relied on because no actual load exits.

SUMMARY OF THE INVENTION

An object of the invention is to eliminate the above-described problems, and to provide a battery checking device in which current from a battery is allowed to flow through an electromagnetic drive device in the form of a train of pulses with such a frequency that the electromagnetic drive device does not operate in response thereto, so that without the accompaniment with the operation of the electromagnetic drive device, a continuous real load current supply is performed in checking the voltage of the battery.

Other objects of the invention will become apparent from the following description of embodiments thereof.

BRIEF DESCRIPTION OF THE DRAWINGS

FIG. 2 is an elevational view of an electromagnetic drive device for a shutter.

FIG. 3 is a side elevational view of the barrel and distance adjusting ring of FIG. 2.

DETAILED DESCRIPTION OF THE PREFERRED EMBODIMENTS

Figure 1:
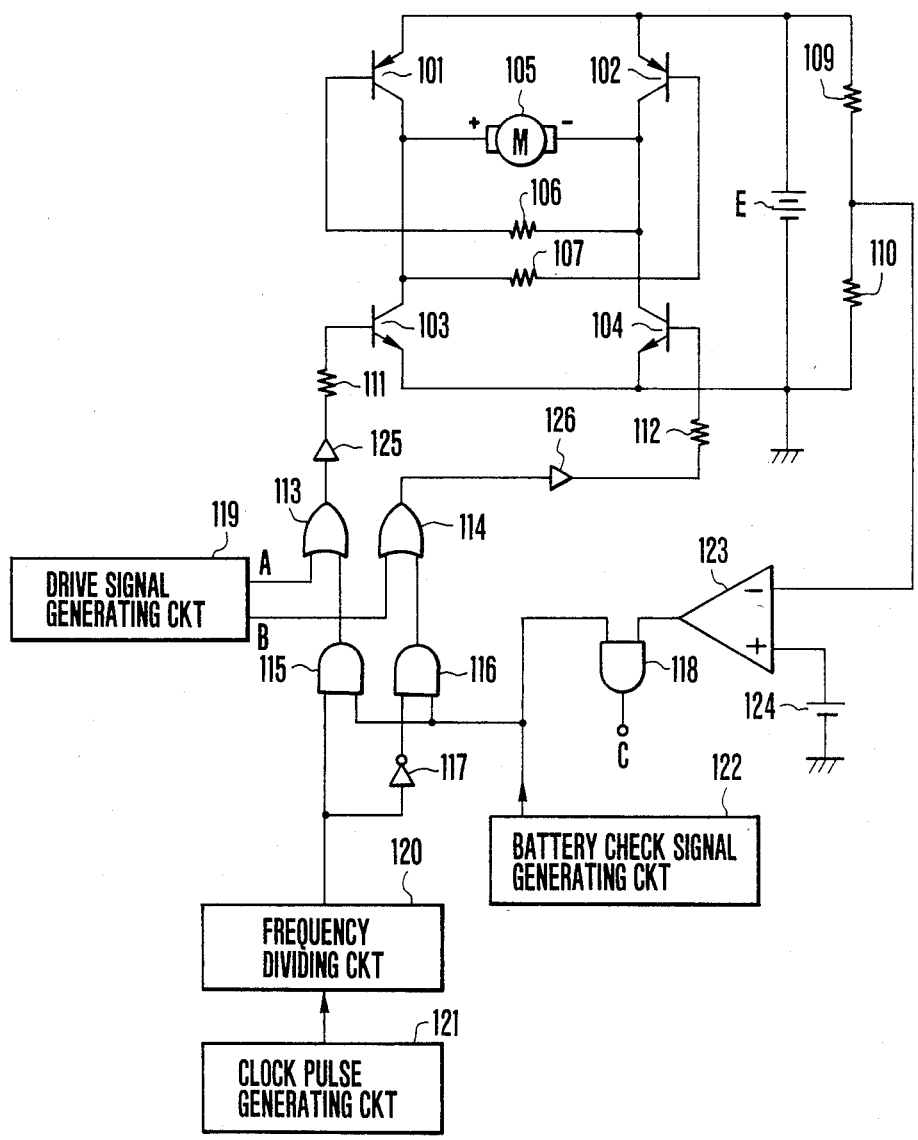
FIG. 1 is an electrical circuit diagram of an embodiment of a battery checking device according to the present invention.

The present invention is next described in connection with an embodiment by reference to the drawings.

In FIG. 1 there is shown a film winding and rewinding control circuit having an electrical power source or battery E. Connected across this battery E are a first series circuit of transistors 101 and 103 and a second series circuit of transistors 102 and 104 in parallel to each other. An electric motor 105 has its winding whose ends connected to the respective junctions of the transistors 101 and 103, and 102 and 104. The base of the transistor 101 is connected through a current limiting resistor 106 to the junction of the transistors 102 and 104. The base of the transistor 102 is connected through a current limiting resistor 107 to the junction of the transistors 101 and 103. A voltage divider of resistors 109 and 110 is also connected across the battery E and has an output which is connected to an input of a comparator 123. The other input of the comparator 123 is connected to a reference voltage source 124. An AND gate 118 has two inputs which are connected to the output of the comparator 123 and the output of a battery checking signal forming cirucit 122 respectively. A clock pulse generating circuit 121 has an output which is connected to the input of a frequency dividing circuit 120. The output of the circuit 120 is connected to one of two inputs of an AND gate 115 and also through an inverter 117 to one of two inputs of an AND gate 116. The other inputs of the AND gate 115 and 116 are connected to the output of the battery checking signal forming circuit 122. A drive signal generating circuit 119 for controlling the current supply to the motor 105 in the normal direction or reverse direction. A signal of an output terminal A of this drive signal generating circuit 119 is applied to an OR gate 113 together with the output of the AND gate 115. A signal of another output terminal B of the drive signal generating circuit 119 is applied to another OR gate 114 together with the output of the AND gate 116. The output of the OR gate 113 is applied through a buffer gate 125 and a current limiting resistor 111 successively to the base of the transistor 103. The output of the OR gate 114 is applied through a buffer gate 126 and a current limiting resistor 112 successively to the base of the transistor 104.

The operation of the circuit of such construction is next described, beginning with a case when film winding is performed by the motor 105.

In this case, the drive signal generating circuit 119 produces a signal of high level at the output terminal B. This signal goes through the OR gate 114, buffer gate 126 and resistor 112 to the base of the transistor 104, thereby the transistor 104 is turned on. At the same time, through the resistor 106 connected to the collector of the transistor 104, the base of the transistor 101 is pulled, thereby the transistor 101 is turned on. Thus, the plus side of the motor 105 is short-circuited to the positive terminal of the battery E, and the minus side of the motor 105 is pulled in the circuit earth. Therefore, the motor 105 is supplied with current in the normal direction, and the film is wound up.

When in the film rewinding mode, the drive signal generating circuit 119 produces a signal of high level at the other output terminal A. Responsive to this signal, the transistors 102 and 103 turn on to supply current to the motor 105 in the reverse direction. Thus, the film is rewound.

When to check the battery voltage, a signal of high level from the battery checking signal generating circuit 122 is applied to the AND gates 115, 116 and 118. Meanwhile, the clock pulses from the circuit 121 are divided in frequency by the circuit 120 so that this frequency dividing circuit 120 produces a train of pulses with such a frequency that the motor 105 will not be responsive thereto. These pulses are then applied to the AND gate 115 and the inverter 117, and the inverted pulses by the inverter 117 are then applied to the AND gate 116. Therefore, the outputs of the AND gates 115 and 116 alternatively take high level and are applied through the respective OR gates 113 and 114 to the motor contorl circuit. As a result, the motor 105 is supplied with current of which the direction of flow changes between the normal and reverse ones repeatedly at an equal frequency to the frequency of the pulses produced from the frequency dividing circuit 120, while nevertheless the motor 105 is not permitted to rotate.

As has been described above, because a load current flows from the battery E to the motor 105 continuously, the voltage of the battery is lowered by the internal resistance. This lowered value of the voltage is divided by the resistors 109 and 110, and this divided voltage is compared with the reference voltage by the comparator 123. If the divided voltage is lower, the comparator 123 produces an output of high level. Therefore, the AND gate 118 produces a signal at the output terminal C which is given to a warning circuit (not shown). Upon looking at a warning display, the operator sees that the life time of the battery has expired.

The motor 105 may be replaced by an electromagnetically operated shutter. A drive control mechanism which not only controls the operation of such a shutter but also has an automatic focusing function, depending on the direction of current flow is shown in FIGS. 2 and 3. In this case, the motor 105 is rewritten as a moving coil of the rotor of the electromagnetically operated shutter. Another modification is that the drive signal generating circuit 119 produces a pulse train for driving motion of the focusing lens barrel at the output terminal B, and an exposure control signal at the output terminal A.

In FIG. 2, a distance adjusting ring 1 is rotatably fitted on the outer diameter of a photographic lens barrel 2 as shown in FIG. 3. The barrel 2 is slidingly axially movable and is urged by a spring 3 in a rearward direction. A cam follower pin 4 which also serves as an adjusting screw for an infinitely distant object rides on one of six similar cams to each other on the ring 1 so that when the ring 1 turns in a closkwise direction as viewed in FIG. 2, the lens barrel 2 is moved forward. 1b is a ratchet provided in the entire length of the outer periphery of the distance adjusting ring 1. A barrel drive plate 5 is slidable relative to pins 6 and 7 and is urged by a spring 8 in a downward direction.

An advancing lever 9 is pivotally mounted at a pin 10 on the barrel drive plate 5 and is urged by a spring 11 in a clockwise direction. A pawled portion 9a of the advancing lever 9 is arranged to be engageable with the ratchet 1b. A latching lever 12 is pivotally mounted at a pin 13 on a base plate (not shown), and is urged by a spring 14 to turn in a clockwise direction. A pawled portion 12a of the latching lever 12 upon engagement with the latchet 1b of the distance adjusting ring 1 stops counterclockwise rotation of the distance adjusting ring 1 which results when the distance adjusting ring 1 is pushed by the cam follower 4 under the action of the spring 3. A barrel drive lever 18 and a rotor 19 are rotatably mounted on a common shaft 20 fixedly mounted on a base plate (not shown). The drive lever 18 has a pin 18a engaging in a cutout portion 5a of the aforesaid barrel drive plate 5, so that when the barrel drive lever 18 turns in the counterclockwise direction, the barrel drive plate 5 is slidingly moved upward.

A printed coil 19a provided on the rotor 19 is connected to a circuit to be described later. When the printed coil 19a is supplied with current from the circuit, its magnetomotive force acts on the magnet 21 and the rotor 19 reacts to rotate in a counterclockwise direction from the illustrated position depending on the direction of the current flow. Motion of the rotor 19 is transmitted through a pin 19b planted thereon and an end portion 18b of the barrel drive lever 18 to the latter. When the direction of the current flow is reversed, the rotor 19 rotates in a clockwise direction from the illustrated position, thereby a shutter mechanism to be described later is operated. In the following, the direction of current flow for the barrel drive is described as the normal direction, and that for the shutter operation as the reverse direction.

22 is a shutter drive lever pivotally mounted at a pin 23 on a base plate (not shown) and urged by a spring 24 in a clockwise direction. One arm 22a of the shutter drive lever 22 abuts on a pin 19c planted on the rotor 19 so that when the rotor 19 turns in the clockwise direction, the shutter drive lever 22 is turned in the counterclockwise direction. A blade opening and closing lever 25 is pivotally mounted at a pin 26 fixedly mounted on the base plate and is urged by a spring 27 in a clockwise direction. At the end of one arm 25a of the blade opening and closing lever 25 there is a blade drive pin 28 engaging in long slots of shutter blades 29 and 30. The shutter blades 29 and 30 are pivotally mounted on respective pins 31 and 32 fixedly mounted to the base plate and close an exposure aperture in the illustrated position. When the lever 25 turns in the clockwise direction, the exposure aperture is opened.

34 is a photo-electric transducer element for light measurement; 30a is an auxiliary aperture for light measurement; 30b is a preliminary aperture for warning low brightness. Another arm 25b of the blade opening and closing lever 25 abuts on a pin 22c planted on the arm 22b of the shutter drive lever 22 and the spring 24 of the shutter drive lever 22 is stronger than the spring 27 of the blade opening and closing lever 25 so that it is held in the blade closing position. A stopper pin 35 defines this closing position of the blade opening and closing lever 25. A blade latching lever 36 is pivotally mounted at the aforesaid pin 23 and is urged by a spring 37 in a clockwise direction so that an engagement portion 36a of its end portion is latched by the blade opening and closing lever 25. Also the engamement portion 36a is brought into engagement with an engagement portion 25c of the blade opening and closing lever 25 just after the start of rotation of the blade opening and closing lever 25. An aperture 38 is bored in the base plate. Although the aperture 38 is actually in axial alignment with the photographic lens barrel 2, here is illustrated it away from the latter for the purpose of better understanding. 39 of FIG. 3 is a lens stip switch arranged to be turned off by an arm 2a of the photographic lens barrel 2 when the photographic lens barrel 2 has moved somewhat distance forward in focusing, and to be turned on when one distance adjusting cam 1a moves away from the follower 4 to set the barrel 2 in the initial position (illustrated position).

The operation of the mechanism of FIGS. 2 and 3 is as follows: When a release button (not shown) is pushed down to a first stroke, a switch SW1 turns on, and the circuit starts to operate. Then, a range finder of known construction measures the object distance.

When the release button is then pushed to the second stroke, the switch SW2 turns on, thereby a current of the normal direction is supplied from the drive signal generating circuit 119 at the output terminal B to the moving coil 19a of the rotor 19 in the form of a corresponding number of pulses to the object distance, each of the pulses going on for 10 msec., for example, and off for 10 msec. Responsive to each pulse, the rotor 19 turns in the counterclockwise direction, while its pin 19b pushing the barrel drive lever 18 at the end 18b thereof. Therefore, the barrel drive lever 18 also turns in the counterclockwise direction.

Because the pin 18a of the barrel drive lever 18 engages in the cutout 5a of the barrel drive plate 5, the barrel drive plate 5 is then moved upward. Because, along with this, the advancing pawl 9 also moves upward, the pawled portion 9a pushes the ratchet 1b of the cam ring 1 to tuen the cam ring 1 in the clockwise direction.

Also, when the cam ring 1 has turned by a prescribed distance, the latching pawl 12 flies into the next pawl of the ratchet 1b, preparing to latch the cam ring 1 in an advanced position by one tooth. The length of movement of the advancing pawl 9 is predetermined to be longer than the one-tooth movement of the cam ring 1 in order to insure that the latching pawl 12 enters the next tooth. When the current supply to the rotor 19 is cut off, therefore, the cam ring 1 is allowed to turn backward to the right position defined by the latch pawl 12. The driving power for this can be obtained from the spring 3 of the lens barrel 2 through the cam follower pin 4 pushing the cam ring 1 at the cam portion 1a to the left.

Also, when the current supply to the rotor 19 is cut off, the barrel drive plate 5 and the rotor 19 are returned to the initial positions by the bias force of the spring 8. Such procedure is repeated a corresponding number of times to the object distance until the lens barrel 2 reaches the in-focus position.

After such an automatic focusing adjustment has been completed, the drive signal generating circuit 119 produces a signal at the output terminal A, therey the moving coil 19a of the rotor 19 is supplied with flowing in the reverse direction. Therefore, the rotor 19 turns in the clockwise direction. Motion of the rotor 19 is transmitted through its pin 19c to turn the shutter drive lever 22 in the counterclockwise direction. The shutter drive lever 22 then strikes with its pin 22c to turn the shutter latch lever 36 in the counterclockwise direction, thereby the engagement portion 36a of the shutter latch lever 36 is disengaged from the extension 25c of the blade opening and closing lever 25. Then, the blade opening and closing lever 25 turns in the clockwise direction by the bias force of the spring 27, thus opening the shutter blades 29 and 30. Meanwhile, an exposure value computer (not shown) measures the object brightness with the light incident on the photo-electric transducer element 34 through the auxiliary aperture 30a of the blade 30. When a computed amount of exposure is reached, the signal which has so far been produced from the output terminal A of the drive signal generating circuit 119 is stopped, and the current supply to the moving coil 19a of the rotor 19 is cut off. Thereby, the shutter drive lever 22 is turned in the clockwise direction by the spring 24, while the pin 22c on its one arm 22b pushing the arm 25b of the blade opening and closing lever 25 to turn in the counterclockwise direction. Thus, the blades 29 and 30 are closed. At the same time, the other arm 22a of the shutter drive lever 22 pushes the pin 19c of the rotor 19 to turn in the counterclockwise direction to the initial position illustrated.

After the exposure operation has been terminated, the drive signal generating circuit 119 produces a signal at the output terminal B. Responsive to this signal, a current supply of the normal direction to the moving coil 19a of the rotor 19 takes place. In a similar manner to that described in connection with the focusing adjustment, the cam ring 1 proceeds to further turn in the clockwise direction. As the photographic lens barrel 2 is moved forward again, when one of the cams 1a moves away from the cam follower pin 4, the barrel 2 is returned to the initial position by the bias force of the spring 3. At this time, the lens stop switch 39 is turned on, causing the drive signal generating circuit 119 to stop the current supply to the moving coil 19a of the rotor 19. Thus, the photographic lens barrel 2 rests in the initial position after one frame of film has been exposed.

As has been described in detail above, according to the present invention, when to check the battery voltage, the current that flows to the electromagnetic drive device is formed to a train of positive and negative going pulses which alternate, wherein their frequency is made to have such a value that the electromagnetic drive device does not operate in response to the pulses, thereby it being made possible to perform a battery checking based on the presence of the continuous real load of the electromagnetic device, while simultaneously holding the electromagnetic drive device, inoperative.

What is claimed is:

1. A battery checking device comprising:
  (a) a pulse generating circuit for producing pulses with such a frequency that a load does not operate in response thereto;
  (b) a control circuit capable of supplying current to the load in both directions, said control circuit responsive to a positive pulse supplying current to the load in one direction, and responsive to negative pulse supplying current to the load in the opposite direction; and
  (c) a checking circuit for detecting the voltage level of an electrical power source as applied across the load when the aforesaid pulse appears at the control circuit,
  said checking circuit producing a warning signal when the voltage of the electrical power source falls below a prescribed level.

2. A device according to claim 1, wherein said load is an electric motor.

3. A device according to claim 1, wherein said load is a rotor of an electromagnetically operated shutter.

4. A device according to claim 1, further comprising:
  a signal generating circuit for producing a check start signal,
  said signal generating circuit applying the check start signal to the control circuit and the checking circuit to initiate an operation.

5. A battery checking device comprising:
  (a) an electromagnetic drive device;
  (b) a pulse generating circuit for producing pulses with such a frequency that said electromagnetic drive device does not operate in response thereto;
  (c) a control circuit capable, upon application of the pulses from said pulse generating circuit thereto, of supplying current to said electromagnetic drive device in both directions,
  said control circuit responsive to positive pulse supplying current to said electromagnetic drive device in one direction and responsive to negative pulse supplying current to said electromagnetic drive device in the opposite direction;
  (d) a detecting circuit for detecting the voltage level of an electrical power source as applied on said electromagnetic drive device; and (e) a signal generating circuit for producing a warning signal when the fact that the voltage level of the electrical power source has fallen below a prescribed level by said detecting circuit as the pulse is applied to said control circuit.

6. A device according to claim 5, wherein said detecting circuit includes a voltage dividing circuit for the voltage of the electrical power source, a reference signal generating circuit, and a comparing circuit for comparing the outputs of these two circuits with each other.

* * * * *